(12) United States Patent
Clavero et al.

(10) Patent No.: US 12,205,061 B2
(45) Date of Patent: Jan. 21, 2025

(54) SHARED DATA INDUCED QUALITY CONTROL FOR A CHEMICAL MECHANICAL PLANARIZATION PROCESS

(71) Applicant: Versum Materials US, LLC, Tempe, AZ (US)

(72) Inventors: Cesar Clavero, Half Moon Bay, CA (US); Vid Gopal, Sunnyvale, CA (US); Ryan Clarke, San Jose, CA (US); Esmeralda Yitamben, Milpitas, CA (US); Hieu Pham, Santa Clara, CA (US); Anupama Mallikarjunan, Shihlin District (TW); Rung-Je Yang, Hsinchu (TW); Shirley Lin, Hsinchu (TW); Hongjun Zhou, Chandler, AZ (US); Joseph Rose, Gilbert, AZ (US); Krishna Murella, Phoenix, AZ (US); Lu Gan, Chandler, AZ (US)

(73) Assignee: Versum Materials US, LLC, Tempe, AZ (US)

( * ) Notice: Subject to any disclaimer, the term of this patent is extended or adjusted under 35 U.S.C. 154(b) by 318 days.

(21) Appl. No.: 17/663,899

(22) Filed: May 18, 2022

(65) Prior Publication Data

US 2023/0325751 A1 Oct. 12, 2023

Related U.S. Application Data

(60) Provisional application No. 63/362,645, filed on Apr. 7, 2022.

(51) Int. Cl.
*G06Q 10/0639* (2023.01)
*G06Q 50/04* (2012.01)

(52) U.S. Cl.
CPC ....... *G06Q 10/06395* (2013.01); *G06Q 50/04* (2013.01)

(58) Field of Classification Search
None
See application file for complete search history.

(56) References Cited

U.S. PATENT DOCUMENTS

| | | | | |
|---|---|---|---|---|
| 6,732,007 B1 * | 5/2004 | Pasadyn | ............ | H01L 21/67276 700/121 |
| 7,001,243 B1 * | 2/2006 | Yi | ......................... | B24B 37/013 451/41 |

(Continued)

*Primary Examiner* — Jermele M Hollington
*Assistant Examiner* — Carl F. R. Tchatchouang
(74) *Attorney, Agent, or Firm* — James D. Wyninegar, Jr.

(57) ABSTRACT

A method for developing or improving a process for producing a product from a material comprising steps of acquiring the composition for at least two slurries as raw material data (17) for the CMP based manufacturing process and its relevant parameters (2) by using a Data Collecting computer (9); physically performing specific method steps of a CMP process; measuring relevant parameters of the used slurries and the physically performed CMP process to determine the CMP process performance by using the Data Collecting computer (9); analyzing the measured data about the relevant parameters with a specific software performed on an Analyzing computer (11) by creating for the software and applying with it a predictive model using Machine Learning to understand the intercorrelation of the different parameters and using the results to improve the CMP process performance and the resulting product quality of the CMP based manufacturing process.

19 Claims, 4 Drawing Sheets

(56) References Cited

U.S. PATENT DOCUMENTS

2019/0286111 A1* 9/2019 Yennie .................... H01L 22/12
2021/0027108 A1* 1/2021 Ishiguro ................ G06F 18/217

* cited by examiner

SHARED DATA INDUCED QUALITY CONTROL FOR A CHEMICAL MECHANICAL PLANARIZATION PROCESS

CROSS REFERENCE TO RELATED APPLICATIONS

This application claims priority to U.S. provisional application 63/362,645 filed on Apr. 7, 2022, the entire contents of which is incorporated herein by reference thereto for all allowable purposes.

BACKGROUND OF THE INVENTION

The disclosed invention relates to a method and a system for ensuring product quality in a CMP based manufacturing process for producing a semiconductor product from one or more materials.

The invention belongs to the technical fields of semiconductor production, quality control, and supply chain optimization.

Modern production processes are very complex matters which are influenced by many variables related to raw material inputs, equipment and tooling, human interactions, and so on. Even the slightest variations can lead to significant quality issues in the finished product, making them inferior or even unsalable. This may result in unacceptable deficiencies for the producer and/or customer, especially in highly regulated industries such as the semiconductor industry. There are many ways known in the state of the art to improve the production process and ensure the quality of the fabricated products. Nowadays, most of these methods are data-driven, where the relevant parameters are monitored and controlled based on data collected from the production process.

A more specific point regarding the field of semiconductor production processes is that the feature size of the circuit components has been fast decreased while the number of metal layers has been fast increased resulting in device topographies to exhibit features that inhibited conformal deposition. The need for the global surface planarization of the various thin filems layers that constitute the integrated circuit (IC) has tremendously increased.

Chemical mechanical planarization is a widely used process in semiconductor device manufacturing in which the surface of a substrate is smoothed and planarized through the combined action of chemical and physical forces on the surface. CMP combines the best of both techniques while avoiding the pitfalls. Whereas purely abrasive grinding of the surface would cause too much physical damage and purely chemical etching would not achieve planarization, the combined action of the two produces a well-planarized surface with minimal damage. A central component of the CMP process is the use of slurries, which usually comprise abrasive particles to mechanically remove material, combined with chemical additives to further tune its performance and reduce defectivity.

Chemical mechanical planarization (CMP) has a number of advantages for semiconductor device manufacturing beyond the fact that it reduces rough topography to a planarized state. CMP allows the device manufacturer to achieve global planarization of the entire wafer surface in a single step. The approach can be used to planarize a wide range of materials, from different metals to different oxide films and from different dielectric films to Back End of the Line (BEOL) metal interconnects. In the latter case, the oxide layer is patterned to create trenches that are subsequently filled with metal, forming a damascene or dual-damascene structure. A barrier layer is initially deposited on the patterned oxide to avoid diffusion of the metal into other layers. Also, a seed layer is frequently used to favor the subsequent metal growth in the trench. The CMP process is applied in this case to remove all the resulting overburden and provide a flat surface for the subsequent layers to grow on. This process is typically comprised by metal CMP and barrier CMP steps, due to the different nature of the used materials. The complexity of the overall process and the different removal rates between metal and dielectric areas lead to some well-known defects in the interconnect structures, the most relevant ones being dishing and erosion. Dishing is observed as a curvature of the top surface of each of the interconnects, while erosion results in an overall reduction of the metal thickness. Both defects detrimentally affect interconnect resistance and the planarity of subsequent layers, and thus the overall device performance. Additionally, issues can arise due to the formation of oxide or other residues on the surface of metal interconnects, or even the presence of ions in the field left behind after the CMP process, often times hard to detect.

Another point is that the composition of the different oxide films to be polished strongly condition the slurry and CMP performance. In the case of dielectrics, slurries are frequently designed to have very high removal rates on oxide films and low on nitrides ones, or vice versa. Other selectivity requirements are often times needed depending on the application. This allows the CMP process to sharply stop when certain components of the stack are reached. Deviations in film composition caused by unintended changes in the deposition process, aging or effects due to the lithography process in the case of patterned structures, among others, can lead to considerable variations in slurry performance. These variations can cause costly quality issues impacting the device fabrication process and yield. A method that allows mapping the response of slurries (e.g. removal rate and defectivity) on films with varying compositions is necessary in order to disentangle quality issues that might arise. Also, a deeper understanding of how the slurry formulations can be tuned for different film compositions is necessary for their further optimization by, for example, increasing the process window within which they are applicable.

A chemical mechanical planarization tool consists of a rotating platen covered by a polishing pad. The wafer is mounted face down in a carrier that is pressed against the pad with a specified force. This force can be provided using either a defined and regulated gas pressure or a mechanical backing pressure system. The wafer also rotates during the polishing process. The polishing pad is saturated with the slurry that is pumped on to the pad. Polishing of the wafer surface occurs as the wafer is rotated on its own axis and moved about the polishing pad while being forced against the pad. During the polishing process, high points on the wafer surface are naturally subjected to more pressure and therefore more abrasive force. This combines with the action of the chemical etchant to produce an enhanced removal rate for material at the high points relative to material at low points in the surface topography. This produces the planarization effect in the process.

A chemical mechanical planarization slurry usually comprises abrasive particles to provide physical forces on the surface; chemical additives to promote the removal rate; chemical additives to reduce dishing; chemical additives to reduce erosion; oxidizers to chemically etch material; activators or a catalysts to interact with oxidizers and facilitate the formation of free radicals; corrosion inhibitor; stabilizers to facilitate or promote stabilization of the composition against settling, flocculation (including precipitation, aggregation or agglomeration of particles, and the like) and decomposition; a surfactant to aid in protecting the wafer surface during and after polishing to reduce defects in the wafer surface; chelating agents; to enhance affinity of chelating ligands for metal cations and/or to prevent build-up of metal ions on pads which causes pad staining and instability in removal rates; pH adjuster, biocides to control biological growth; a solvent such as water. CMP slurries use chemical materials heavily.

Controlling slurry quality and interconnect defectivity caused after CMP process is increasingly complicated since interconnect dimensions are being aggressively reduced in new technology nodes. Interconnect widths are now well below 40 nm for many of the metallization levels in both logic and memory devices. At this point, detecting slurry variations due to quality issues is extremely difficult by only using traditional physical characterization techniques such as Atomic Force Microscopy (AFM) or Scanning Electron Microscopy (SEM) cross section. Additionally, slurry development aimed at minimizing defectivity at low dimensionality is increasingly difficult for the same reasons.

Also, to achieve efficient planarization at miniaturized device dimensions, there is a need for a better understanding and thus a better control of the physics, chemistry and the complex interplay of tribo-mechanical phenomena occurring at the interface of the pad and wafer in presence of the fluid slurry.

Production processes for CMP slurries are thus very complex matters which are dependent on many parameters and variables regarding the involved materials, tools, production machines, responsible workers and so on. It is therefore necessary to characterize, optimize and model the process.

To improve the production process and ensure the quality of the products there are many ways known in the state of the art to supervise the whole process. Most of them are nowadays data-driven where the relevant parameters and variables of the production process are monitored and checked regularly if they do not meet their target values.

To comply with and enhance such state of the art it would therefore be desirable to find a new approach to operate automatic production management systems which further enhances the production process regarding quality and reliability, and which can handle different processes, especially CMP processes, efficiently.

Therefore it would be desirable to find a new approach to operate automatic production management systems which further enhances the production process regarding the resulting product quality, especially regarding an improved CMP process.

BRIEF SUMMARY OF THE INVENTION

This task can be solved by a method for ensuring product quality in a semiconductor device manufacturing process using Chemical mechanical planarization comprising the following steps of acquiring the composition for at least two slurries as raw material data for the CMP based manufacturing process and its relevant parameters by using a Data Collecting computer; physically performing specific steps of a CMP process; measuring relevant parameters of the used slurries and the physically performed CMP process to determine the CMP process performance by using the Data Collecting computer; analyzing the measured data about the relevant parameters with a specific software performed on an Analyzing computer by creating for the software and applying with it a predictive model using Machine Learning to understand the intercorrelation of the different parameters and using the results to improve the CMP process performance and the resulting product quality of the CMP based manufacturing process. Core of the invention is to first track all the possibly relevant data related to the desired production process which shall be created or improved, in particular the raw material data described by its specific parameters. Therefore the data can be different regarding to structure, format, syntax etc. While the invented method can be used to improve every production process where a product is created from different raw materials, it is especially suitable to be used in semiconductor device manufacturing processes, preferably those ones which use CMP processes. After the process is successfully defined by acquiring all necessary data including the assigned raw material data and the measured data the actual process evaluation takes place in the analyzing step. During that evaluation a special software is fed with the mapped raw material data and eventually process data and analyzes it's content searching for specific patterns and dependencies which disclose characteristics of a process which can be used to improve the established process. The software can use different kinds of algorithms. It could use for instance an artificial intelligence approach like supervised, unsupervised, semi-supervised and reinforcement learning etc. Which one is most suitable depends on the kind of available raw material and ev. process data. Important is that the algorithm gets trained to find patterns or identify influencing factors of the process. The approach can be implemented by using Gradient Boosted Decision Trees, artificial neural networks (ANN) or other. This ANN could then further improve its performance by learning on its fed, mapped raw material data. But also other AI software approaches are possible. The software could alternatively also use approaches from classical statistics, if they are suitable to determine the characteristics. Also physics-based and mechanistic models, like mass balances can be used. Which approach is then most suitable and therefore chosen depends on the specific case and the respective kind of raw material data. After the mapped and analyzed process is created and the characteristics are identified those characteristics are applied to the production process, therefore improving it and the resulting product quality. Those characteristics can be used additionally to insights gained from process experts to improve the product quality. By variation of different lots of the same raw material, different predictions for the finished goods quality are obtained. The better the software is able to determine the characteristics the less expertise from human experts is necessary. The minimum requirement for the involved computers includes their ability to process, transfer and maybe display the data and to perform the software analyzing step. The computers itself can be different computers at different locations which are connected to each other via internet, local networks etc or some or all of them can be identical.

Advantageous and therefore preferred further developments of this invention emerge from the associated sub claims and from the description and the associated drawings.

One of those preferred further developments of the disclosed method comprise that for acquiring the data for the production process and its relevant parameters the process data is retrieved from a database which is connected to the Data Collecting computer, created by observing the process using data collecting devices, notably sensors, and/or provided by a human user. Which of these approaches in which combination depends on the target production process. Usually the process data is of a better quality if at least some current data from sensors is involved.

Another one of those preferred further developments of the disclosed method comprise that acquiring the data by observing the production process is done during previous executions of the process and/or during a current execution after using the detected deviations. By doing that, it is ensured that the acquired data is always up-to-date. It also greatly improves the efficiency of using AI methods like ANNs if they are trained and used with up-to-date information.

Another one of those preferred further developments of the disclosed method comprise that analyzing the data is performed by the software using supervised and unsupervised algorithms including a data analysis framework with a data model using approaches like Multivariate Analysis like PLS regression, PCA, Random Forest, XGBoost, and artificial Neural Networks, PLS regression and/or Random Forest or the like, or using supervised and/or unsupervised static algorithms. Both kinds of algorithms—supervised and AI related or not—can be used by the software. But the more complex the process in question is, the more difficult it becomes to provide a software with a non-learning approach which really identifies all the wanted process characteristics. Those are more suitable for but of course not limited to less complex production processes or if only specific defined process parts need to be evaluated.

Another one of those preferred further developments of the disclosed method comprise that analyzing the data is performed using mechanistic models, physics based models, models based on (partial) differential equations and models based on quantum chemical computations. The method is not limited to those model types but they are the most suitable ones.

Another one of those preferred further developments of the disclosed method comprise that wherein the structure of the supervised algorithms is the result of training the PLS regression, PCA, Random Forest, XGBoost and artificial neural networks, or the like with the the measured data about defectivity and electrical response. Artificial Neural Network (ANN) or the like are very suitable to evaluate those complex production processes because they can not only be trained with the the measured data about defectivity and electrical response and therefore be adapted to the production process no matter how complex it gets. They can also be used in several re-iterations of the invented method getting better and better adapted the more often they are used to detect the deviations.

Another one of those preferred further developments of the disclosed method comprise that additionally the following steps of polishing a test vehicle with interconnects with dimensions representative for advanced nodes; measuring defectivity using physical characterization techniques; measuring electrical response of the interconnects are performed and the analyzing step comprises of analyzing the measured data about defectivity and electrical response with the specific software and by creating an electrical response predictive model to understand the intercorrelation of the different parameters and using the results to detect deviations from the baseline; and using the detected deviations to improve the resulting product quality of the CMP based manufacturing process. The method step of the electrical test is extremely sensitive to variations in the defectivity, like dishing, erosion, oxidation, etc., of interconnects after polishing and can be used to detect variations in the slurry quality due to variations in the raw materials, preparation process or shelf life, among others. Core to this specific part of the invention is to establish a resistance predictive model to correlate the interconnect characteristics and defectivity to the expected electrical response. By doing so, deviations to the expected performance can be easily identified.

Another one of those preferred further developments of the disclosed method comprise that the used dimensions representative for advanced nodes are less than 40 nm width.

Another one of those preferred further developments of the disclosed method comprise that a proactive quality control system uses the resistance of interconnects with different widths to identify deviations in the performance of slurries from different origins. The previously established Machine Learning predictive model allows to estimate the associated level of defectivity caused by slurry variations. In ideal conditions, such understanding can be used to infer the root cause of the slurry variation. The control system can be established via a software performed on the Analyzing computer, Data Collecting Computer or any other suitable computer, like a control computer for production machines at the production sites.

Another one of those preferred further developments of the disclosed method comprise that the proactive quality control system uses the leakage across comb-like structures to detect possible contamination or defects left behind by the slurries and/or post-CMP treatment. An increase in leakage could be tracked down to the presence of unwanted contaminants in the slurry or an incorrect application of the product.

Another one of those preferred further developments of the disclosed method comprise that the evaluation of the performance of a particular barrier slurry is done while the slurry is used on two different barrier materials. In some cases, interactions between slurry and barrier materials by, for example, catalytic effects can lead to unexpected results hard to detect with conventional physical characterization methods. Electrical characterization combined with the understanding of the expected CMP response included in the Machine Learning Predictive model allow identifying deviations.

Another one of those preferred further developments of the disclosed method comprise that additionally the following steps of depositing thin films with varying compositions, physically characterizing the films to determine their composition and other properties such as density, hardness and elastic modulus, performing a CMP process of the films to determine the performance of different slurries with varying formulation, such as removal rate and defectivity among others are performed to acquire all these data in a database of the Data Collecting computer to finally using the specific software to create a predictive model with Machine Learning algorithms to connect the film composition and properties with a slurry formulation and a CMP overall performance.

Another one of those preferred further developments of the disclosed method comprise that the deposition of thin films is performed by co-sputtering using different targets and/or using different gas ratios to vary the composition during reactive sputtering.

A further component of the claimed invention is a system for ensuring product quality in a semiconductor device manufacturing process using Chemical mechanical planarization a Data Collecting computer with a connected database being used to acquire the composition for at least two slurries as raw material data for the CMP based manufacturing process and its relevant parameters; a polishing device for polishing a test vehicle with interconnects with dimensions representative for advanced nodes;

at least one sensor device for relevant parameters of the used slurries and the physically performed CMP process to determine the CMP process performance by using the Data Collecting computer; and an Analyzing computer including a specific software performed on it using supervised algorithms including a data analysis framework with a data model wherein the software analyzes the measured data about the relevant parameters and applies it to a predictive model using Machine Learning to understand the intercorrelation of the different parameters and using the results to improve the CMP process performance and the resulting product quality of the CMP based manufacturing process. That system performs the invented method. As already explained the mentioned computers in the system can be established as separate system components or be the same computer or a combination thereof whatever suits best. At least the Analyzing computer with the specific software should preferably be a separate computer. If the raw material data is acquired automatically then the Data Collecting computer needs to be connected with a kind of an automatic control that is computer-based in each of the production sites. There the algorithm on the Analyzing computer writes back into the respective system control to the production crew which lot id should be used for the production. The types of the used computers then depends on the requirements of the performed method. If most of the method steps are performed by human users a kind of personal computer, tablet, mobile phone or the like with a display and some data input means or interfaces so the users can provide the data to the computers and the used software should be used. The more automated the method is performed also other types of computers like industrial pcs, microcontrollers, single-board or embedded computers in general can be used. A clear defined data interface and data transfer network, like ethernet, bus-systems or wireless alternatives, for automatic data transmissions gets then more important.

Another one of those preferred further developments of the disclosed system comprise that the Data Collecting computer is hosting a computer based digital platform which is used to acquire the process data from the at least one factory. Another possibility of acquiring the necessary process data lies in using a digital platform for the data acquiring to which all participating production sites can transfer their process relevant data. The platform will then manage this data and distribute it to the respective Analyzing computer to perform the Analyzing step.

Another one of those preferred further developments of the disclosed system comprise that the Analyzing computer is a server which hosts the software with the supervised and/or unsupervised algorithm, notably a XGBoost, Random Forest or artificial neural network, and the Process Performing computer is part of or identical to the respective computer based control terminal for the at least two production sites. Like already mentioned if human users are required to perform part of the method steps the used computers must provide respective in- and output means, like keyboards, mouse, screens, and the like, and respective software to process this input. If an ANN is used by the software a suitable computer hardware for this ANN is required.

A further component of the hereby disclosed invention is an XGBoost, Random Forest or artificial neural network, or other AI approach which structure is dependent on being trained with specific training data which is created by acquiring the composition for at least two slurries as raw material data for the CMP based manufacturing process and its relevant parameters by using a Data Collecting computer; physically performing specific method steps of a CMP process; measuring relevant parameters of the used slurries and the physically performed CMP process to determine the CMP process performance by using the Data Collecting computer; assigning the acquired raw material data related to the relevant parameters of the semiconductor device manufacturing process to its corresponding process parts and creating training data from the assigned raw material data and the measured data. The therefore created training data is then used to train the software and establish its necessary internal structure so it can be used to analyze the mapped process data to identify the required process characteristics. By providing the software with the real process data it is further trained and improves its analyzing performance.

Another component of the disclosed invention is a Computer program comprising instructions which cause the involved computers to carry out the following method steps of acquiring the composition for at least two slurries as raw material data for the CMP based manufacturing process and its relevant parameters by using a Data Collecting computer; physically performing specific method steps of a CMP process; measuring relevant parameters of the used slurries and the physically performed CMP process to determine the CMP process performance by using the Data Collecting computer; analyzing the measured data about the relevant parameters with a specific software performed on an Analyzing computer by creating for the software and applying with it a predictive model using Machine Learning to understand the intercorrelation of the different parameters and using the results to improve the CMP process performance and the resulting product quality of the CMP based manufacturing process. The program parts responsible for the single method steps are running on the respective computer parts. How the program itself is partitioned depends on the computer hardware being involved. It is possible to use a main software running on one of the mentioned computers or a separate computer which controls local client programs. Other options include equal instances of the software who communicate with each other and so on.

Only requirement for this computer program to perform the whole method as described is, that the used program and its respective hardware components are able to perform the method completely and automatically. Such a program can then be stored on a Computer-readable storage medium and/or data carrier signal which cause the involved computers to carry out the method steps of acquiring the composition for at least two slurries as raw material data for the CMP based manufacturing process and its relevant parameters by using a Data Collecting computer; physically performing specific method steps of a CMP process; measuring relevant parameters of the used slurries and the physically performed CMP process to determine the CMP process performance by using the Data Collecting computer; analyzing the measured data about the relevant parameters with a specific software performed on an Analyzing computer by creating for the software and applying with it a predictive model using Machine Learning to understand the intercorrelation of the different parameters and using the results to improve the CMP process performance and the resulting product quality of the CMP based manufacturing process. The storage medium can be stored on any suitable digital memory like an usb drive, a harddisk, a flashdrive and so on. From that memory it can also be provided via remota communication means using respective data carrier signals, like ethernet, wired or wireless, or any other suitable network transmission means, for transmitting the software to its target hardware.

DETAILED DESCRIPTION OF THE INVENTION

The invention will be explained in more detail by presenting two preferred exemplary embodiments which disclose respective ways for a proactive quality control system for materials based on data like historical performance, customer factors, attributes, and material processing, raw material, and intermediate factors and attributes.

Figure 1:
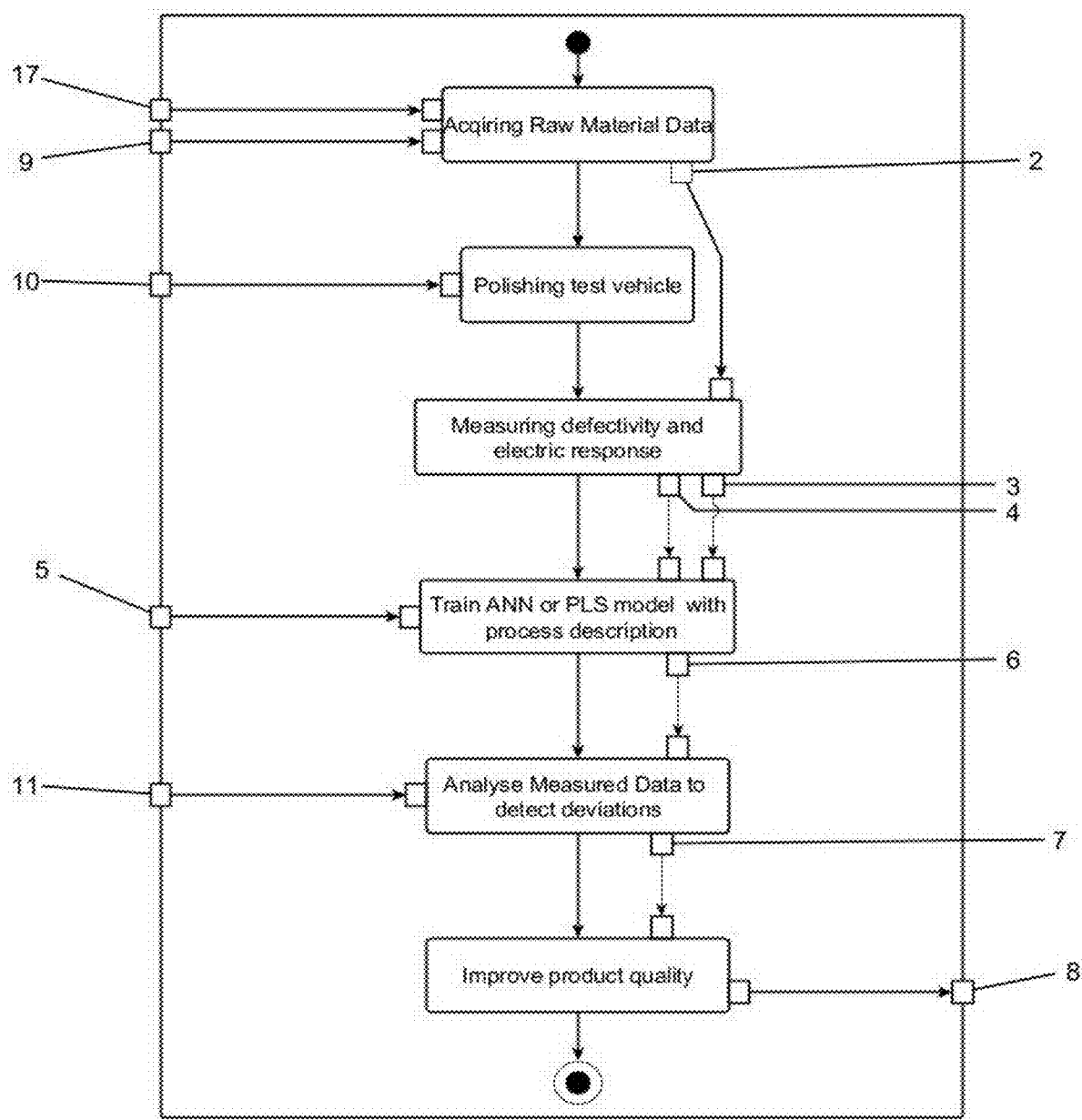
FIG. 1: a general overview about the necessary method steps
Figure 2:
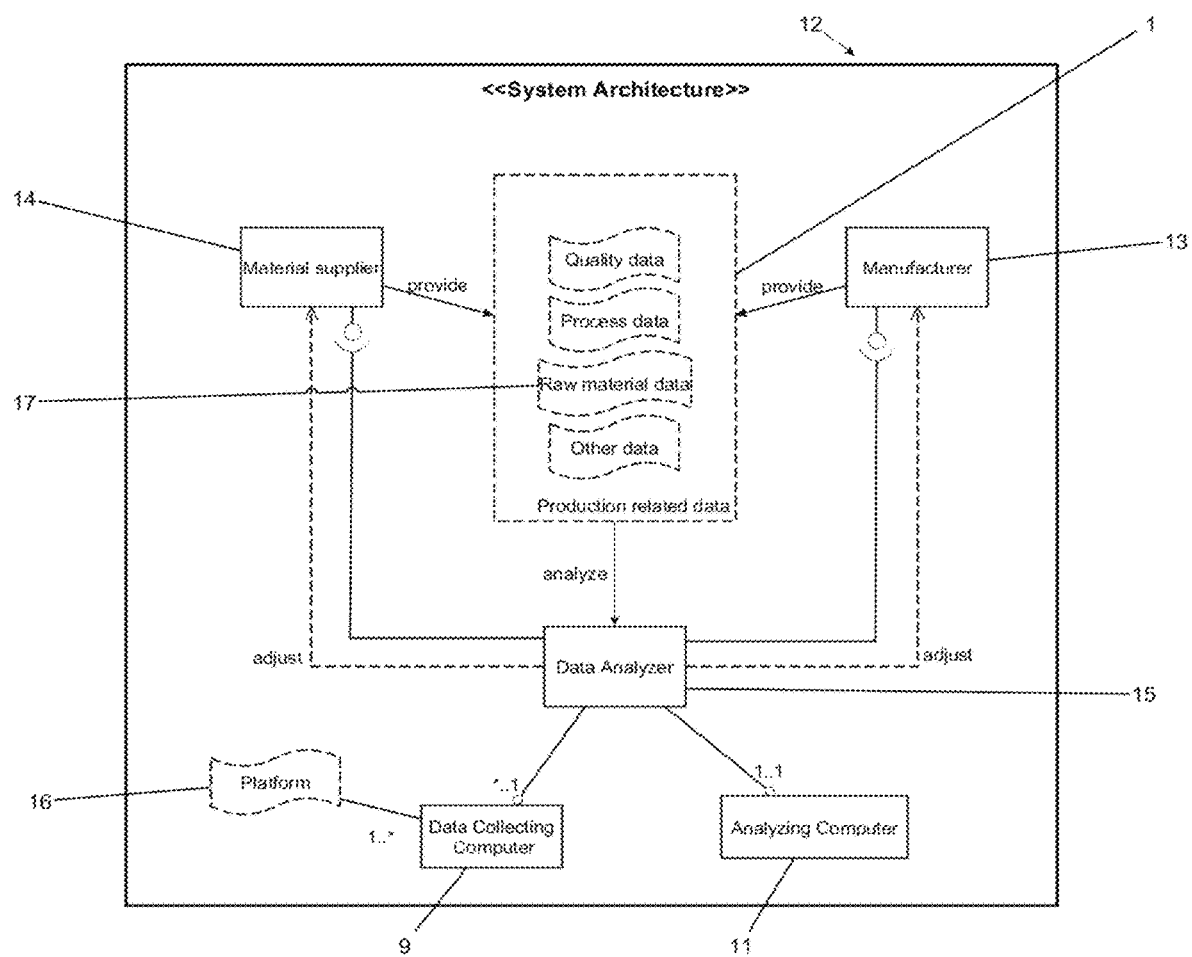
FIG. 2: an schematic overview about the involved system components

FIG. 1 shows an overview about the necessary method steps in both embodiments. The steps itself are performed divergent in every exemplary embodiment dependent on the different conditions. The semiconductor production system 12 which performs the method is shown in FIG. 2. As previously explained its structure can also differ from embodiment to embodiment. Especially the kind of involved computers can differ greatly, depending on how much of the steps is performed by human users with the help of computers and application software or done automatically by specific computers using for instance AI software.

FIG. 2 discloses an schematic overview about the involved system components. In this example there is a Material Supplier Site 14 and a Manufacturer Site 13 wherein the Material Supplier Site 14 provides production related data 1 like data about raw material 17 and its separated parameters 2, quality data from the Material Supplier, other data and so on. This data is collected by the Data Collecting Computer 9 which performs a Data Integration and provides the data then to the used Data Model 5, 6 like an PLS Model or an artificial neural network. The Manufacturer Site 13 provides data about its own production process, its own quality data, other data etc. This data is then transferred via a Secure Data Transfer Connector. The communication of the data between the two sites 13, 14 is performed by web services, which are assigned to the sites. Additionally or alternatively also third party web services can be used. This could be e.g. a centrally managed by a Digital Data Platform 16.

Figure 3:
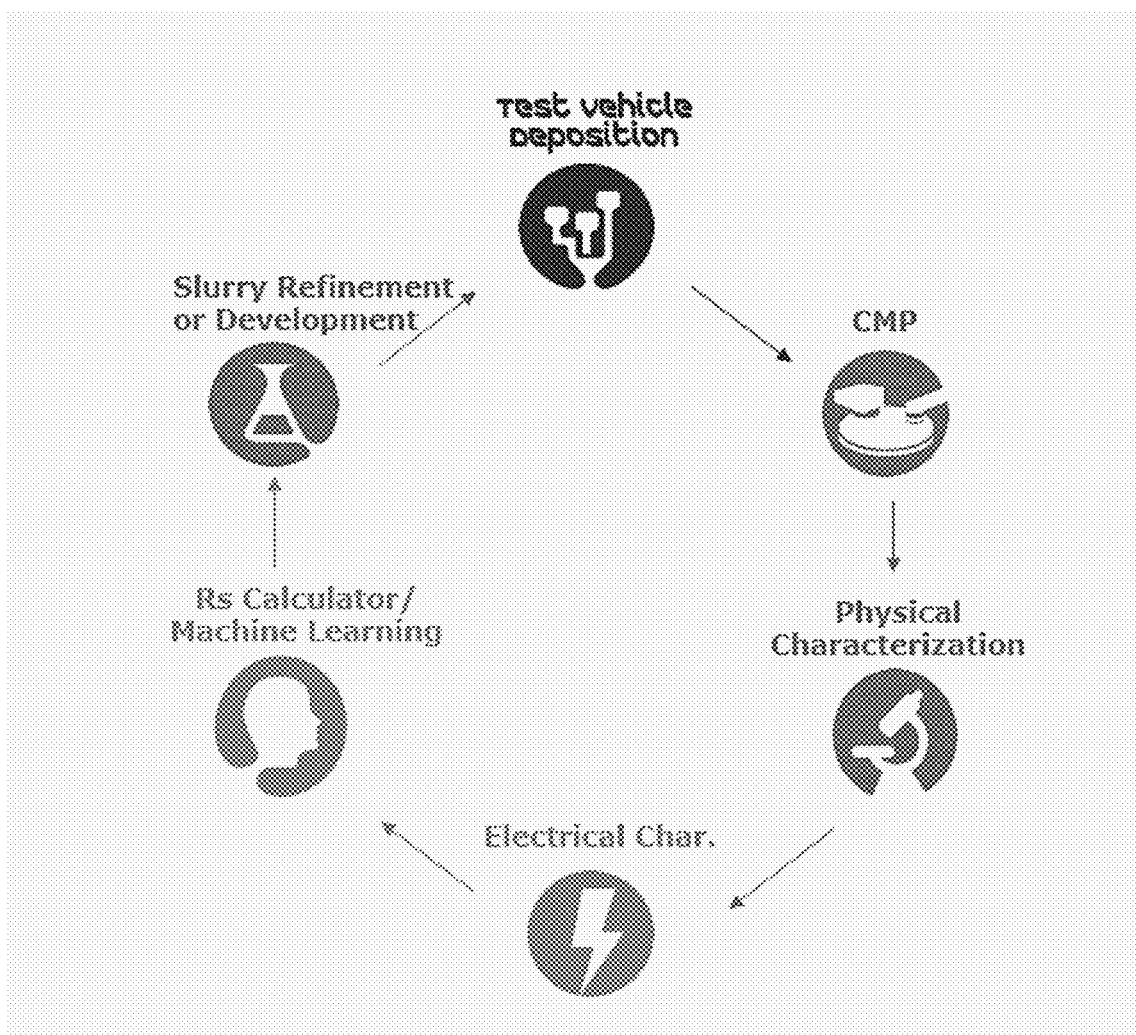
FIG. 3: A flowchart about the third embodiment process steps

A preferred first embodiment comprises the use of a CMP test vehicle with copper interconnects in the form of serpentines with varying widths below, for example, nm. FIG. 3 shows the approach in a schematic process overview, summarized it comprises the use of a CMP test vehicle 10 with metallic interconnects, CMP on said test vehicle 10 using the slurry under test, physical and electrical characterization, analysis of the data using the previously established Machine Learning model which is run a software performed on a Analyzing Computer 11 to evaluate the performance of the slurry. This new understanding is then used to refine or improve the slurry. Said test vehicle 10 is polished using a commercial CMP system tool, that consists of a rotating platen covered by a polishing pad. The wafer is mounted face down in a carrier that is pressed against the pad with a specified force. The polishing pad is saturated with a slurry that is pumped on to the pad. Polishing of the wafer surface occurs as the wafer is rotated on its own axis and moved on the polishing pad while being forced against the same. In order to detect deviations in the CMP process due to, for example, quality issues, the CMP response curve of the interconnect system can be mapped by using a series of slurries with varying particle sizes and shapes. Also different additives to, for example, modify the resulting pH of the slurry can be used.

After polishing, the defectivity caused by the different slurries is probed by both physical and electrical means. Physical characterization of dishing and erosion can be carried out using scanning probe methods such as AFM, or electron microscopy methods such as SEM, Transmission Electron Microscopy (TEM) or related methods. Electrical characterization of said interconnects of varying widths and locations on the wafer is carried out using a semi-automated electrical tester to measure their resistance.

All the obtained physical and electrical characterization information, CMP process parameters and slurries formulation, including abrasive characteristics, additive nature and concentration, and other available quality controls and certificate of analysis (CoA) of each of the raw components, is stored in a database using a Data Collecting computer 9.

A Machine Learning algorithm, for example a Neural Network 5, 6, performed va a software by the aforementioned Analyzing Computer 11 is used to train a model able to correlate electrical response to all the above mentioned variables explored during the experiment. This allows to clearly understand the intercorrelations existing between CMP process, slurry characteristics and resulting defectivity 3 and electrical response 4. Such understanding can be used to, for example, establish a process baseline and understand the origin of deviations 7 due to quality issues in the source raw materials or slurry preparation process. It can alternatively be used to optimize the formulation of slurries aimed at different interconnect metals and/or barrier materials.

Figure 4:
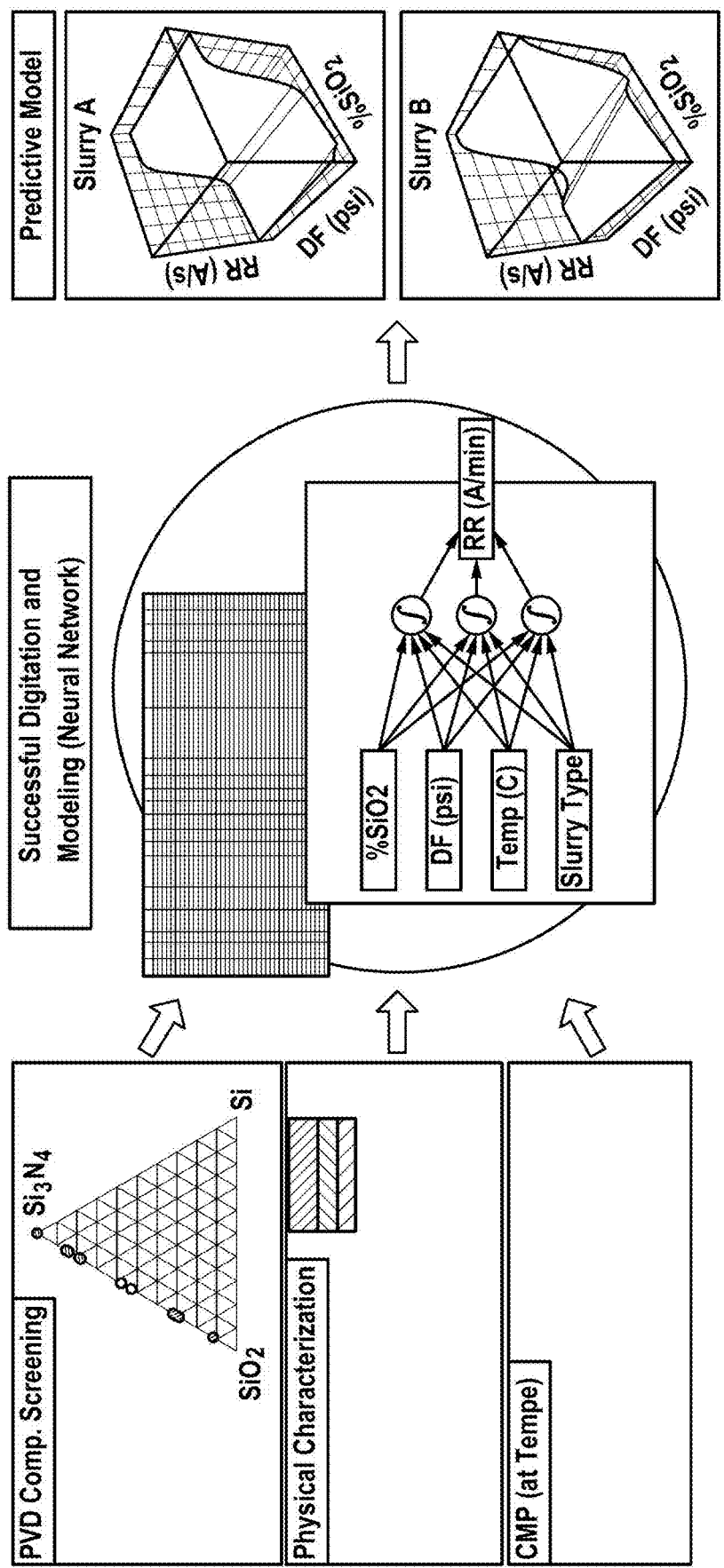
FIG. 4: An schematic overview about the fourth embodiment

Another preferred second embodiment comprises the use of a combinatorial sputtering system able to house two or more targets and to modify the substrate temperature during deposition to promote film densification. FIG. 4 shows an summary of this approach. It comprises of the use of a combinatorial sputtering system to screen Silicon oxynitride compositions, physical characterization and CMP process. All the data is collected in a unified database and a Neural Network model 5, 6 is used to explain the observed response. It will be shown with further details in the following sentences. The system 12 allows varying the resulting thin film deposition composition by either varying the ratio of power applied to different targets during deposition, and/or by modifying the sputtering atmosphere by introducing different reactive gases such as oxygen and nitrogen. This allows, for example, to obtain a wide compositional screening of Silicon oxynitride thin films. The composition of these films can be obtained by using conventional characterization techniques such as Rutherford Backscattering Spectroscopy (RBS) or other calibrated techniques. The density and thickness of said films can be obtained using X-ray Reflectometry (XRR). Finally, mechanical properties of the films such as hardness and elastic modulus can be obtained using nanoindentation.

The films with varying compositions are polished using a commercial CMP system tool, that consists of a rotating platen covered by a polishing pad. The wafer is mounted face down in a carrier that is pressed against the pad with a specified force. The polishing pad is saturated with a slurry that is pumped on to the pad. Polishing of the wafer surface occurs as the wafer is rotated on its own axis and moved on the polishing pad while being forced against the same. The removal rate (RR) for the slurry is obtained by measuring the thickness of the film after polishing with ellipsometry.

The deposition parameters of the films with varying composition, the physical characterization information, the CMP process parameters and the slurry formulation is stored in a database using a Data Collecting computer 9.

A Machine Learning algorithm, like a Neural Network, which is run a software performed on a Analyzing Computer 11 is used to train a model able to correlate all the above mentioned parameters explored during the experiment. This model allows to clearly understand and predict in the future the intercorrelations existing between thin film composition, slurry formulation and CMP process parameters and performance. Such understanding can be used to, for example, to establish a process baseline and understand the origin of deviations 7 due to quality issues in the thin film being processed. It can alternatively be used to optimize the formulation of slurries aimed at, for example, widening their applicability to different thin film compositions.

With these approaches realized as an example in the presented two embodiments the batch automation leads to a significant reduction in finished goods quality variation. This allows transparency on expected finished goods quality based on raw material lot selections and predictive models, leading to a further improvement in the lot selection process and less need to rework or scrap batches.

The continuous data integration additionally allows to monitor the prediction quality and improves the used data models based on the ongoing incoming new information. In a further preferred embodiment the system can also be extended to automate the lot selection in non-edge cases, thus reducing the manual effort of the supply chain planner.

LIST OF REFERENCES

1 Available production related data
2 Separated parameters of raw material data
3 Defictivity
4 Electric response
5 Untrained neural network or PLS model
6 Trained neural network or PLS models
7 Detected deviations from the baseline
8 Improved product quality
9 Data Collecting computer
10 Test Vehicle
11 Analyzing computer
12 Semiconductor Production system
13 Manufacturer Site
14 Material Supplier
15 Data Analyzer
16 Digital Data Platform
17 Raw material data

The invention claimed is:

1. A method for ensuring product quality in a semiconductor device manufacturing process using Chemical mechanical planarization comprising the following steps:

acquiring the composition for at least two slurries as raw material data (17) for the CMP based manufacturing process and its relevant parameters (2) by using a Data Collecting computer (9);

physically performing specific method steps of a CMP process;

measuring relevant parameters of the used slurries and the physically performed CMP process to determine the CMP process performance by using the Data Collecting computer (9);

analyzing the measured data about the relevant parameters with a specific software performed on an Analyzing computer (11) by creating for the software and applying with it a predictive model using Machine Learning to understand the intercorrelation of the different parameters and using the results to improve the CMP process performance and the resulting product quality of the CMP based manufacturing process.

2. The method of claim 1, wherein for acquiring the data (1) for the production process and its relevant parameters (2) the raw material data (17) is retrieved from a database which is connected to the Data Collecting computer (9), created by observing the process using data collecting devices, notably sensors, and/or provided by a human user.

3. The method of claim 2, wherein acquiring the data (1) is done during previous executions of the process and/or during a current execution after using the detected deviations (7).

4. The method of claim 1, wherein analyzing the measured data about defectivity and electrical response is performed by the software using supervised algorithms including a data analysis framework with a data model (3, 4) using approaches like Multivariate Analysis like PLS regression, PCA, Random Forest, XGBoost and artificial neural networks, or the like, or using supervised and/or unsupervised algorithms.

5. The method of claim 4, wherein analyzing the measured data is performed using mechanistic models, physics based models, models based on partial differential equations and models based on quantum chemical computations.

6. The method of claim 4, wherein the structure of the supervised algorithms is the result of training the PLS regression, PCA, Random Forest, XGBoost and artificial neural networks (6), or the like with the measured data about defectivity and electrical response.

7. The method of claim 1, wherein additionally the following steps of polishing a test vehicle (10) with interconnects with dimensions representative for advanced nodes; measuring defectivity (3) using physical characterization techniques; measuring electrical response (4) of the interconnects are performed and the analyzing step comprises of analyzing the measured data about defectivity and electrical response (3, 4) with the specific software and by creating an electrical response predictive model to understand the intercorrelation of the different parameters and using the results to detect deviations (7) from the baseline; and using the detected deviations (7) to improve the resulting product quality of the CMP based manufacturing process.

8. The method of claim 7, wherein the used dimensions representative for advanced nodes are less than 40 nm width.

9. The method of claim 7, wherein a proactive quality control system uses the resistance of interconnects with different widths to identify deviations in the performance of slurries from different origins.

10. The method of any of claims 7, wherein a proactive quality control system uses the leakage across comb-like structures to detect possible contamination or defects left behind by the slurries and/or post-CMP treatment.

11. The method of any of claims 7, wherein an evaluation of the performance of a particular barrier slurry is done while using the slurry on two different barrier materials.

12. The method of claim 1, wherein additionally the following steps of depositing thin films with varying compositions, physically characterizing the films to determine their composition and other properties such as density, hardness and elastic modulus, performing a CMP process of the films to determine the performance of different slurries with varying formulation, such as removal rate and defectivity (3) among others are performed to acquire all these data in a database of the Data Collecting computer (9) to finally using the specific software to create a predictive model (5, 6) with Machine Learning algorithms to connect the film composition and properties with a slurry formulation and a CMP overall performance.

13. The method of claim 12, wherein the deposition of thin films is performed by co-sputtering using different targets and/or using different gas ratios to vary the composition during reactive sputtering.

14. A System (12) for ensuring product quality in a semiconductor device manufacturing process using Chemical mechanical planarization comprising:
    a Data Collecting computer (9) with a connected database being used to acquire the composition for at least two slurries as raw material data (17) for the CMP based manufacturing process and its relevant parameters (2);
    a polishing device for polishing a test vehicle with interconnects with dimensions representative for advanced nodes;
    at least one sensor device for relevant parameters of the used slurries and the physically performed CMP process to determine the CMP process performance by using the Data Collecting computer (9); and
    an Analyzing computer (11) including a specific software performed on it using supervised algorithms including a data analysis framework with a data model (5, 6) wherein the software analyzes the measured data about the relevant parameters and applies it to a predictive model using Machine Learning to understand the intercorrelation of the different parameters and using the results to improve the CMP process performance and the resulting product quality of the CMP based manufacturing process.

15. The System according to claim 14, wherein the Data Collecting computer (9) is hosting a computer based digital platform (16) which is used to acquire the raw material data (17) from the at least one factory (15, 16).

16. The System according to claim 15, wherein the Analyzing computer (11) is a server which hosts the software with the supervised and/or unsupervised algorithms, notably an artificial neural network, and the Process Performing computer is part of or identical to the respective computer based control terminal for the at least one factory (15, 16).

17. An XGBoost, Random Forest or artificial neural network (7) which structure is dependent on being trained with specific training data which is created by the following steps:
    acquiring the composition for at least two slurries as raw material data (17) for the CMP based manufacturing process and its relevant parameters (2) by using a Data Collecting computer (9);
    physically performing specific method steps of a CMP process;
    measuring relevant parameters of the used slurries and the physically performed CMP process to determine the CMP process performance by using the Data Collecting computer (9);
    assigning the acquired raw material data (17) related to the relevant parameters (2) of the semiconductor device manufacturing process to its corresponding process parts and creating training data from the assigned raw material data (17) and the measured data.

18. A Computer-readable storage medium and/or data carrier signal having stored thereon the computer program of claim 17 which cause the involved computers to carry out the following method steps:
    acquiring the composition for at least two slurries as raw material data (17) for the CMP based manufacturing process and its relevant parameters (2) by using a Data Collecting computer (9);
    physically performing specific method steps of a CMP process;
    measuring relevant parameters of the used slurries and the physically performed CMP process to determine the CMP process performance by using the Data Collecting computer (9);
    analyzing the measured data about the relevant parameters with a specific software performed on an Analyzing computer (11) by creating for the software and applying with it a predictive model using Machine Learning to understand the intercorrelation of the different parameters and using the results to improve the CMP process performance and the resulting product quality of the CMP based manufacturing process.

19. A Computer program comprising instructions which cause the involved computers to carry out the following method steps:
    acquiring the composition for at least two slurries as raw material data (17) for the CMP based manufacturing process and its relevant parameters (2) by using a Data Collecting computer (9);
    physically performing specific method steps of a CMP process;
    measuring relevant parameters of the used slurries and the physically performed CMP process to determine the CMP process performance by using the Data Collecting computer (9);
    analyzing the measured data about the relevant parameters with a specific software performed on an Analyzing computer (11) by creating for the software and applying with it a predictive model using Machine Learning to understand the intercorrelation of the different parameters and using the results to improve the CMP process performance and the resulting product quality of the CMP based manufacturing process.

* * * * *